United States Patent
Kondo

(10) Patent No.: US 7,527,166 B2
(45) Date of Patent: May 5, 2009

(54) STORAGE APPARATUS

(75) Inventor: Hiroshi Kondo, Aichi-ken (JP)

(73) Assignee: Toyoda Gosei Co., Ltd., Aichi-pref. (JP)

(*) Notice: Subject to any disclaimer, the term of this patent is extended or adjusted under 35 U.S.C. 154(b) by 580 days.

(21) Appl. No.: 10/901,071

(22) Filed: Jul. 29, 2004

(65) Prior Publication Data

US 2005/0023280 A1 Feb. 3, 2005

(30) Foreign Application Priority Data

Jul. 30, 2003 (JP) ............................. 2003-283031

(51) Int. Cl.
*B65D 43/18* (2006.01)
*B65D 43/22* (2006.01)

(52) U.S. Cl. ...................... 220/825; 220/830

(58) Field of Classification Search .............. 16/354; 224/542, 539; 296/37.12, 24.34; 220/827, 220/825, 810, 262

See application file for complete search history.

(56) References Cited

U.S. PATENT DOCUMENTS

| | | | | |
|---|---|---|---|---|
| 1,345,123 A * | 6/1920 | Bryant | .................. | 422/301 |
| 2,245,487 A * | 6/1941 | Machin | .................. | 220/259.2 |
| 3,848,769 A * | 11/1974 | Beil | .................. | 220/845 |
| 4,470,220 A * | 9/1984 | Sudo | .................. | 49/379 |
| 5,065,884 A * | 11/1991 | Naritomi et al. | .................. | 220/264 |
| 5,280,848 A * | 1/1994 | Moore | .................. | 224/282 |
| 5,520,313 A * | 5/1996 | Toshihide | .................. | 224/539 |
| 5,544,620 A * | 8/1996 | Sarkissian | .................. | 119/166 |
| 5,620,122 A * | 4/1997 | Tanaka | .................. | 224/275 |
| 5,873,468 A * | 2/1999 | Ejima et al. | .................. | 206/711 |
| 5,893,478 A * | 4/1999 | Maruoka | .................. | 220/264 |
| 6,032,802 A * | 3/2000 | Ejima et al. | .................. | 206/711 |
| 6,267,256 B1 * | 7/2001 | Thilly | .................. | 211/60.1 |

(Continued)

FOREIGN PATENT DOCUMENTS

EP 115644 A1 * 8/1984

(Continued)

OTHER PUBLICATIONS

Translation of Japanese Publication No. 09-249059. "Small Article Box Structure for Automobile". Sep. 22, 1997, p. 1 Lines 16-18, and p. 6 Lines 20-21.*

(Continued)

*Primary Examiner*—Anthony D Stashick
*Assistant Examiner*—Robert J Hicks
(74) *Attorney, Agent, or Firm*—Posz Law Group, PLC

(57) ABSTRACT

A storage apparatus includes a base, an assembly frame, a box, a cover, and an open/close mechanism. The assembly frame is demarcated in the base. The box is buried in the assembly frame, and has a surface in which a storage opening is opened. The cover covers the storage opening and can be opened or closed. The open/close mechanism includes a guide portion, a guided portion, and an interval disposed between the guide portion and the guided portion. The guide portion is disposed on the assembly frame and/or the box. The guided portion is disposed on the cover and is guided by the guide portion. The interval is minimized at one of an open position, at which the cover opens the storage opening, and a closed position, at which the cover closes the storage opening.

18 Claims, 7 Drawing Sheets

U.S. PATENT DOCUMENTS

| | | | |
|---|---|---|---|
| 6,499,785 B2 * | 12/2002 | Eguchi | 296/37.8 |
| 6,609,631 B2 * | 8/2003 | Asami | 220/817 |
| 6,715,727 B2 * | 4/2004 | Sambonmatsu | 248/311.2 |
| 6,749,079 B2 * | 6/2004 | Katagiri et al. | 220/345.2 |
| 7,063,225 B2 * | 6/2006 | Fukuo | 220/264 |
| 2003/0178434 A1 * | 9/2003 | Kato | 220/811 |
| 2004/0020935 A1 * | 2/2004 | Inari | 220/830 |
| 2004/0080173 A1 * | 4/2004 | Niwa et al. | 296/24.34 |
| 2004/0140685 A1 * | 7/2004 | Bieck et al. | 296/37.12 |
| 2005/0146150 A1 * | 7/2005 | Niwa et al. | 296/24.34 |
| 2007/0067958 A1 * | 3/2007 | Salice | 16/354 |

FOREIGN PATENT DOCUMENTS

| | | |
|---|---|---|
| JP | U-05-037592 | 5/1993 |
| JP | U-07-26253 | 5/1995 |
| JP | A-08-207641 | 8/1996 |
| JP | A-09-249059 | 9/1997 |
| JP | A-200-25983 | 1/2003 |
| JP | A-2003-25893 | 1/2003 |
| JP | A-2003-25983 | 1/2003 |

OTHER PUBLICATIONS

Notification of Reasons for Refusal dated Aug. 7, 2007 in corresponding Patent application No. 2003-283031.

* cited by examiner

STORAGE APPARATUS

BACKGROUND OF THE INVENTION

1. Field of the Invention

The present invention relates to a storage apparatus, such as cup holders and ashtrays. More specifically, it relates to a mechanism for opening and closing storage apparatuses.

2. Description of the Related Art

FIG. 6 illustrates a top schematic diagram of a conventional cup holder. Moreover, FIG. 7 illustrates a cross-sectional view taken along the arrows "7"-"7" of FIG. 6. As shown in the drawings, a cup holder 100 is buried in an assembly frame 105 which is demarcated in a center console 104. The cup holder 100 comprises a box 101 and a cover 102. The cover 102 is disposed rotatably in the box 101 so that it can open and close the box 101. Paired positioning tags 103 protrude from the major-direction opposite ends of the box 101. A positioning hole 106 is bored through the paired positioning tags 103. On the other hand, positioning projections 107 protrude from the rear surface of the center console 104 so as to face the positioning holes 106, respectively. The positioning projections 107 are deformed at the bottom end by thermal crimping so as to fasten them to the positioning holes 106. Thus, the box 101 is assembled with the center console 104.

However, in the conventional cup holder 100, the cover 102 might rattle at an open position where the cover 102 opens the storage opening 108 of the box 101, or at a close position where the cover 102 closes the storage opening 108 of the box 101.

Hence, Japanese Unexamined Patent Publication (KOKAI) No. 2003-25,893 discloses a cup holder which inhibits a cover from rattling with buffer members which are fitted around the bosses of a cover. However, in the cup holder disclosed in the publication, the number of the component parts increases comparatively by a quantity of the disposed buffer members. Moreover, the buffer members always contact with the cover and box elastically. Accordingly, the buffer members enlarge the resistance when opening and closing the cover. Moreover, Japanese Unexamined Utility Model Publication (KOKAI) Nos. 5-37,592 and 7-26,253 disclose glove boxes in which an elastic force of elastic members is utilized to inhibit the cover from rattling at the close position. However, in the glove boxes disclosed in the publications, the space between the cover and an assembly frame of the instrument panel is localized when the assembly position of the cover is misaligned with respect to the assembly frame. Consequently, it is not possible to completely inhibit the cover from rattling by the elastic force of the elastic members alone.

SUMMARY OF THE INVENTION

The present invention has been developed and completed in view of such circumstances. It is therefore an object of the present invention to provide a storage apparatus which can inhibit its cover from rattling at the open position and/or the close position. It is a further object of the present invention to provide an opening/closing mechanism for storage apparatuses which can inhibit their covers from rattling at the open position and/or the close position.

A storage apparatus according to the present invention can solve the aforementioned problems, and comprises:
a base in which an assembly frame is demarcated;
a box buried in the assembly frame, and having a surface in which a storage opening is opened;
a cover covering the storage opening openably and closably; and
means for opening and closing the cover, the means comprising:
a guide portion disposed on at least one of the assembly frame and the box;
a guided portion disposed on the cover, and being guided by the guide portion; and
an interval disposed between the guide portion and the guided portion, and being minimized at at least one of an open position, at which the cover opens the storage opening, and a close position, at which the cover closes the storage opening.

The cover opening/closing means of the present storage apparatus controls the space between the guide portion and the guided portion as described above. As a result, the present storage apparatus can inhibit the cover from rattling at the open position and/or the close position. Note that the term, "being minimized," herein includes the instance that the interval between the guide portion and the guided portion is zero.

It is preferable to arrange the present storage apparatus so that the guide portion can be a guide rib extending in an opening/closing direction of the cover; the guided portion can be a guided dent in which the guide rib is accommodated; the guide rib can have a rib width L1 at the open position and/or the close position, and a rib width L2 at an intermediate position between the open position and the close position; the guided dent can have a dent width S; and the rib width L1, the rib width L2 and the dent width S can establish a relationship, L2<S≦L1.

The rib width L2 and the dent width S are controlled so as to be L2<S in order to inhibit the guide rib from interfering with the guided portion in the middle of opening and closing the cover. The dent width S and the rib width L1 are controlled so as to be S≦L1 in order to more firmly inhibit the cover from rattling at the open position and/or close position.

It is preferable to arrange the present storage apparatus so that the guide portion and the guided portion are located in a plane that passes substantially through the middle of the cover in the major direction of the cover. This arrangement enables a datum position, which inhibits the cover from rattling, to be placed substantially in the middle of the cover in the major direction of the cover. Accordingly, it is possible to inhibit the space between the assembly frame and the cover from localizing. In this instance, the guide portion and the guided portion can preferably be disposed at a position present in a range of ±50 mm, further ±20 mm, from the absolute middle in the major direction of the cover, or alternatively In a range of ±10% from the absolute middle with respect to an overall length of the cover in the major direction.

It is preferable to arrange the present storage apparatus so that the guided portion can travel on a predetermined track when the cover opens and closes the storage opening; and the guide portion can be disposed over the entire track of the guided portion. This arrangement can not only provide the cover with certain play between itself and the box, but also inhibit the cover from rattling even when it is placed at all locations in the middle of opening and closing.

It is preferable to arrange the present storage apparatus so that the guide can be disposed on the assembly frame at least; the cover can be assembled with the box; and the box can be assembled with the base. Note that, in the conventional cup holder 100 shown in FIGS. 6 and 7, the space D between the cover 102 and the assembly frame 105 has enlarged relatively when the cover 102 is at the close position. Otherwise, the space D between the cover 102 and the assembly frame 105 has localized when the cover 102 is at the close position. The disadvantages result from the fact that the cover 102 is assembled with the center console 104 indirectly by way of the box 101. That is, the cover 102 is assembled with the box 101, and the box 101 is assembled with the center console 104. Therefore, the space D is adversely affected by the assembly error of the box 101 with respect to the center console 104 as well as the assembly error of the cover 102 with respect to the box 101. The enlarged space D has degraded the decorativeness of the conventional cup holder 100. Likewise, the localized space D has degraded the decorativeness.

In view of the disadvantage of the conventional cup holder 100, the above-described preferable arrangement of the present storage apparatus comprises the guided portion disposed on the cover, and the guided portion disposed on the assembly frame. Accordingly, the guided portion and guide portion can absorb the assembly error of the cover when assembling the present storage apparatus. In other words, it is possible to carry out positioning the cover with respect to the assembly frame. Therefore, the preferable arrangement can minimize the space between the cover and the assembly frame when the cover is at the close position, though the cover is assembled with the base by way of the box similarly to the conventional cup holder 100 illustrated in FIGS. 6 and 7.

It is preferable to arrange the present storage apparatus so that it can further comprise a space in which the cover is accommodated at the open position, wherein: the cover comprises a plurality of comb-shaped teeth for inhibiting small articles from coming into the space; and the guided dent is demarcated between a pair of neighboring comb-shaped teeth of the comb-shaped teeth. With such an arrangement, it is possible to provide the present storage container with the guided dent by utilizing the comb-shaped teeth. Consequently, the present storage apparatus can comprise a reduced number of component parts.

In accordance with the present invention, it is possible to provide a storage container whose cover is inhibited from rattling at the open position and/or the close position, or to provide an opening/closing mechanism for storage apparatuses which inhibits their cover from rattling at the open position and/or the close position.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims. Hereinafter, the present invention will be described with reference to forms of embodying the present storage apparatus as an in-vehicle cup holder.

EXAMPLES

Example No. 1

Figure 1:
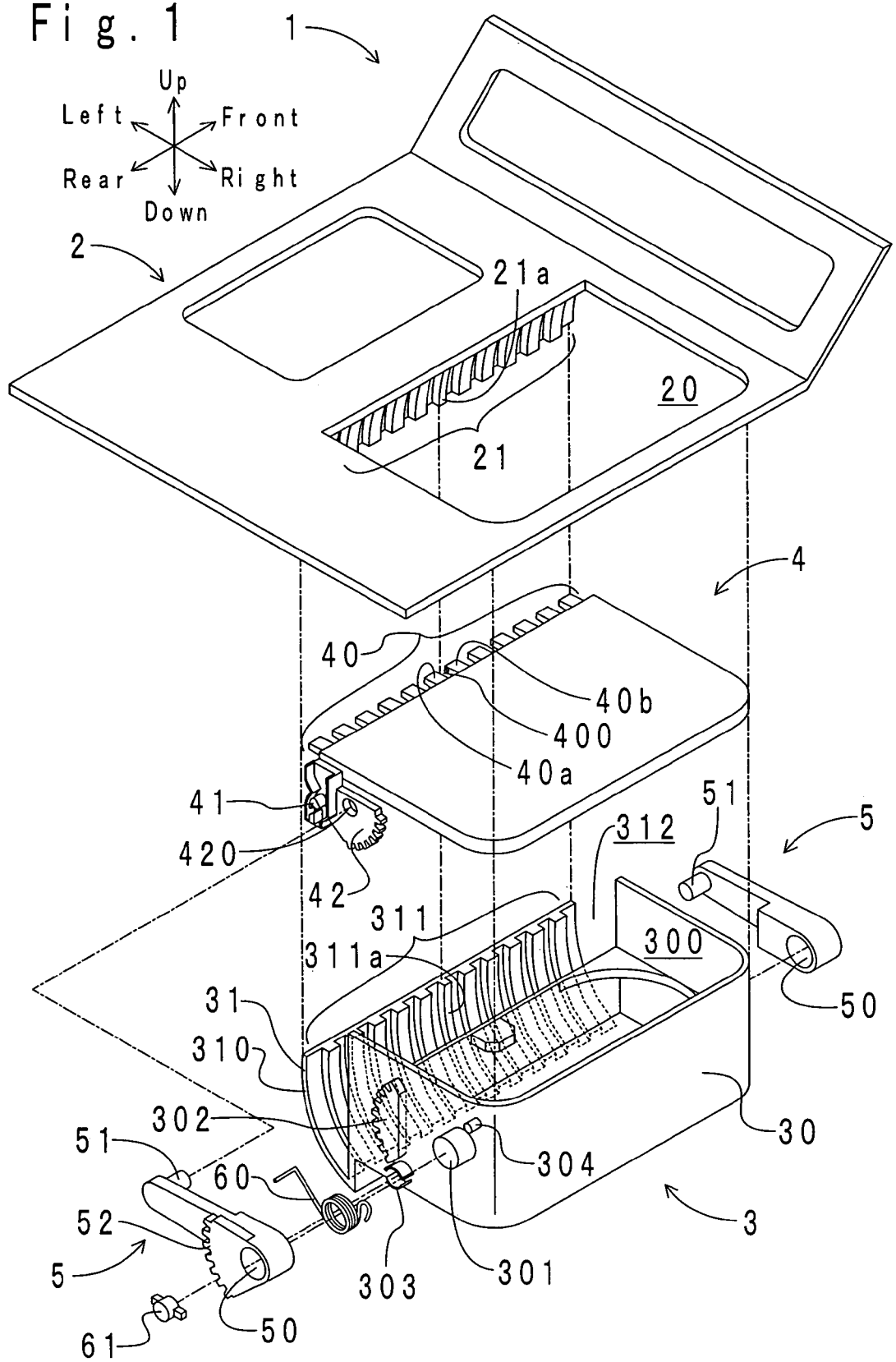
FIG. 1 is an exploded perspective view of a storage apparatus according to Example No. 1 of the present invention.

First, the arrangement of a storage apparatus according to Example No. 1 of the present invention will be hereinafter described in detail. FIG. 1 illustrates an exploded view of the storage apparatus according to Example No. 1. As shown in the drawing, a storage apparatus 1 comprises a center console 2, a box 3, a cover 4, and arms 5. Note that the present base includes the center console 2. The center console 2 is made of resin, and is formed as a plate shape. The center console 2 is disposed between a driver's seat and a navigator's seat. In the center console 2, an assembly frame 20 is opened, and is formed as a long rectangular shape in the front/rear direction. On the left peripheral wall of the assembly frame 20, the frame-side guide ribs 21 are formed. The frame-side guide ribs 21 extend downward. The frame-side guide ribs 21 are disposed in a quantity of 11 pieces in the front/rear direction. Note that present guide rib includes a middle frame-side guide rib 21a of the frame-side guide ribs 21.

The box 3 comprises a body 30 and a cover accommodating portion 31. The body 30 is made of resin, and is formed as box shape. In the top surface of the body 30, a storage opening 300 is opened. An arm swinging boss 301 protrudes from the right end in the outer rear wall of the body 30. Further, a spring fastening boss 304 protrudes from the outer rear wall above the arm swinging boss 301. Furthermore, an arc-shaped box-side gear 302 is disposed on the left of the arm swinging boss 301. Moreover, a damper fastening cylinder 303 is disposed under the box-side gear 302. In addition, an oil damper 61 is fastened to the damper fastening cylinder 303. On the other hand, another arm swinging boss and box-side gear (not shown) are disposed on the outer front wall of the body 30 in the same positional relationship as that of the arm swinging boss 301 and box-side gear 302.

The cover accommodating portion 31 is disposed on the left side of the body 30 integrally therewith. The cover accommodating portion 31 comprises an arc-shaped guide wall 310 which extends in the up/down direction. On the arc-shaped guide wall 310, box-side guide ribs 311 are formed which extend in the up/down direction. The box-side guide ribs 311 are disposed in a quantity of 11 pieces in the front/rear direction. Note that present guide rib includes a middle box-side guide rib 311a of the box-side guide ribs 311. The box-side guide ribs 311 are made continuous integrally when being assembled with the frame-side guide ribs 21. The arc-shaped guide wall 310 and the left wall of the body 30 demarcate a cover accommodating space 312.

The cover 4 is made of resin, and is formed as a rectangular plate shape. Comb-shaped teeth 40 protrude from the left periphery of the cover 4. The comb-shaped teeth 40 are disposed in a quantity of 12 pieces in the front/rear direction. A guided dent 400 is demarcated between the middle paired comb-shaped teeth 40a and 40b. The comb-shaped teeth 40, the frame-side guide ribs 21 and the box-side guide ribs 311 are disposed in an alternate manner. The frame-side guide rib 21a and box-side guide rib 311a are fitted into the guided dent 400. A heart-shaped cam 41 is disposed at the rear end of the cover 4. Further, a cover-side gear 42 is disposed on the right side of the heart-shaped cam 41 and is parallel with the heart-shaped cam 41. Furthermore, a swing hole 420 is bored through on the inner peripheral side of the cover-side gear 42. The cover-side gear 42 meshes with the box-side gear 302. On the other hand, another cover-side gear (not shown) is disposed on the front end of the cover 4. Likewise, the another cover-side gear meshes with the another box-side gear (not shown) disposed at the front end of the box 3.

The arms 5 are made of resin, and are formed as a fine plate shape. The arms 5 are disposed in a quantity of two, one at the front end of the box 3 and another at the rear end thereof, so as to hold the box 3. A swing hole 50 is bored through at the right end of the arm 5. The arm swinging bosses 301 are fitted into the swing holes 50. Therefore, the arms 5 can swing about the arm swinging bosses 301. On the other hand, a cover swinging boss 51 protrudes from the left end of each arm 5. One of the cover swinging bosses 51 is fitted into the swing hole 420 of the cover-side gear 42, and the other cover swinging boss 51 is fitted into the swing hole of the other cover-side gear. Therefore, the cover 4 can swing about the cover swinging bosses 51. A spring 60 is fitted around the arm swinging boss 301 which is fitted into the swing hole 50 of the rear arm 5, one of the paired arms 5. One of the opposite ends of the spring 60 is fastened to the spring fastening boss 304. The other one of the opposite ends of the spring 60 is fastened to the rear arm 5. Moreover, an arc-shaped damper gear 52 is disposed on the rear arm 5. The damper gear 52 meshes with the oil damper 61.

Figure 2:
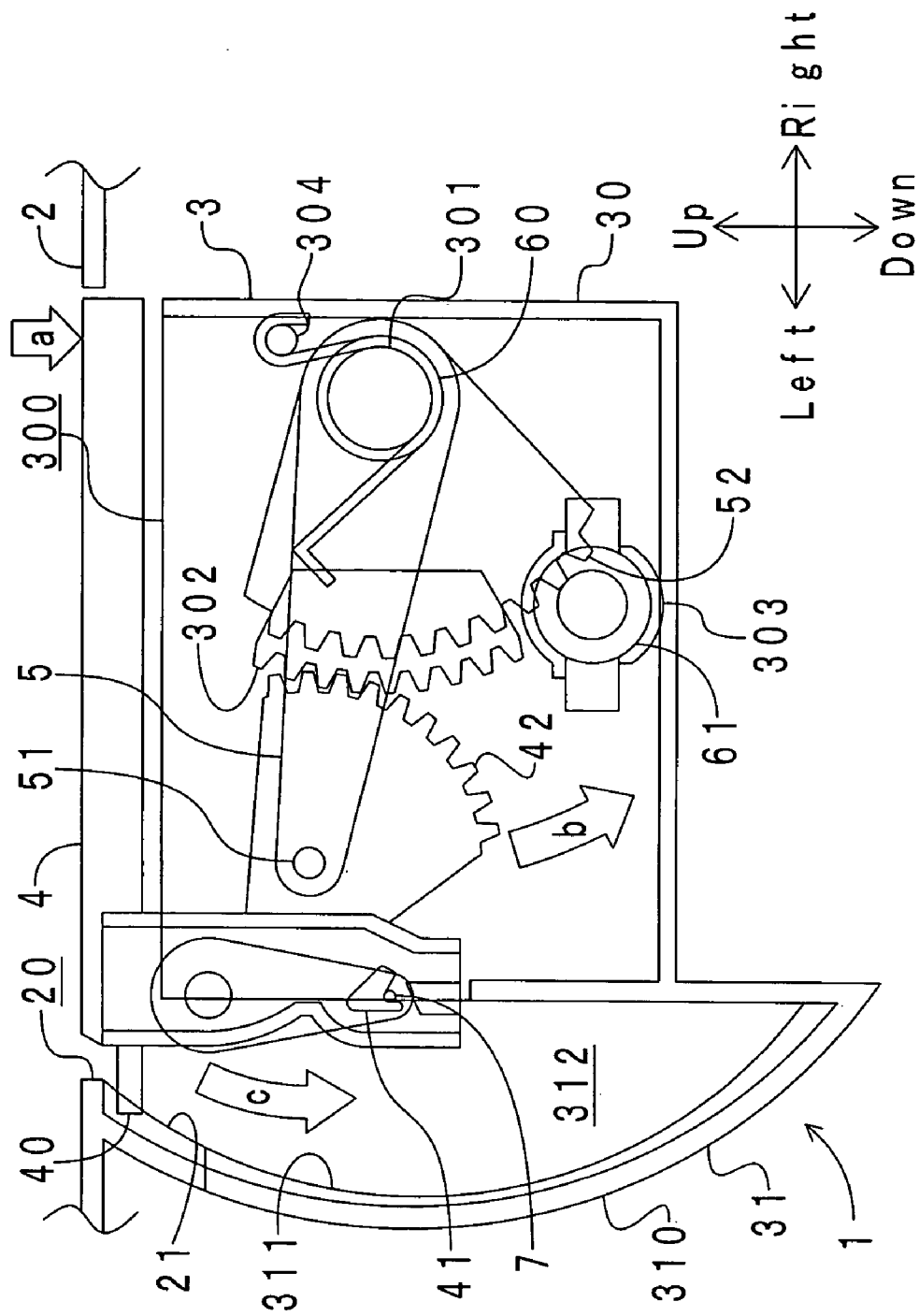
FIG. 2 is a minor-direction see-through cross-sectional view of the storage apparatus according to Example No. 1 at the close position.
Figure 3:
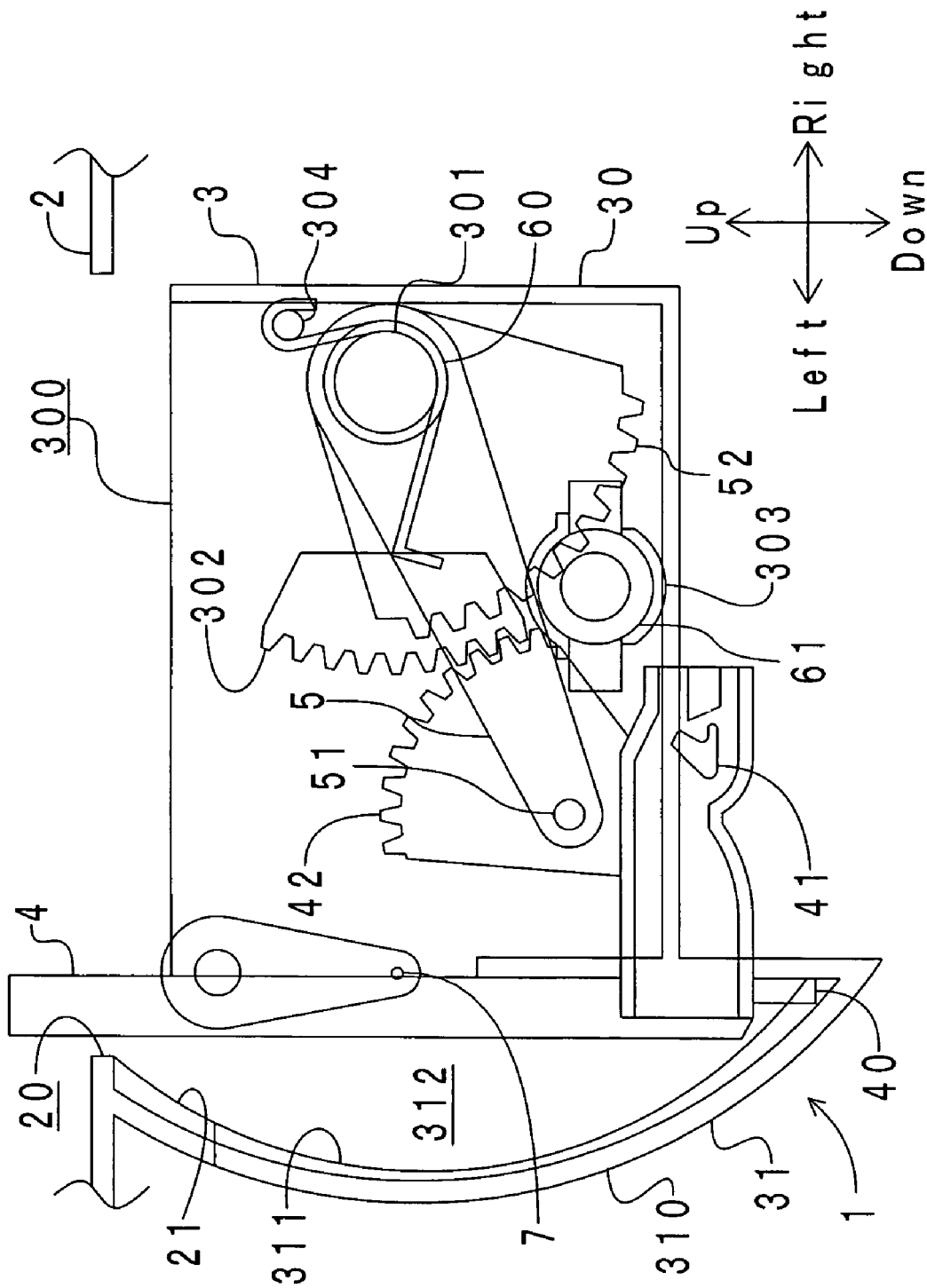
FIG. 3 is a minor-direction see-through cross-sectional view of the storage apparatus according to Example No. 1 at the open position.

The operations of the storage apparatus 1 according to Example No. 1 will be hereinafter described, operations which are demonstrated when actuating the storage apparatus 1 from the open position to the close position or vice versa. FIG. 2 illustrates a minor-direction see-through cross-sectional view of the storage apparatus 1 at the close position. FIG. 3 illustrates a minor-direction see-through cross-sectional view of the storage apparatus 1 at the open position.

When an operator applies an actuation force to the cover 4, which is at the close position shown in FIG. 2, in the direction of the arrow "a" of the drawing, a pin 7, which is held rotatably to the rear periphery of the assembly frame 20, comes off the heart-shaped cam 41. Note that the spring 60 always urges the rear arm 5 in the opening direction. Accordingly, when the pin 7 comes off the heart-shaped cam 41, the urging force of the spring 60 swings the arms 5 about the arm swinging bosses 301 in the direction of the arrow "b" of the drawing. Note that the box-side gear 302 meshes with the cover-side gear 42. Consequently, the cover 4 swings about the arm swinging bosses 301. Moreover, when the cover 4 swings, the cover 4 swings about the cover swinging bosses 51. That is, the cover 4 moves in the direction of the arrow "c" of the drawing to come into the cover accommodating space 312. Note that the damper gear 52 of the rear arm 5 meshes with the oil damper 61. Accordingly, the swinging speed of the arms 5 and cover 4 is regulated. When the cover 4 is accommodated in the cover accommodating space 312 substantially vertically, the cover 4 is placed at the open position shown in FIG. 3. Thus, the storage apparatus 1 is switched from the close position to the open position.

Figure 4:
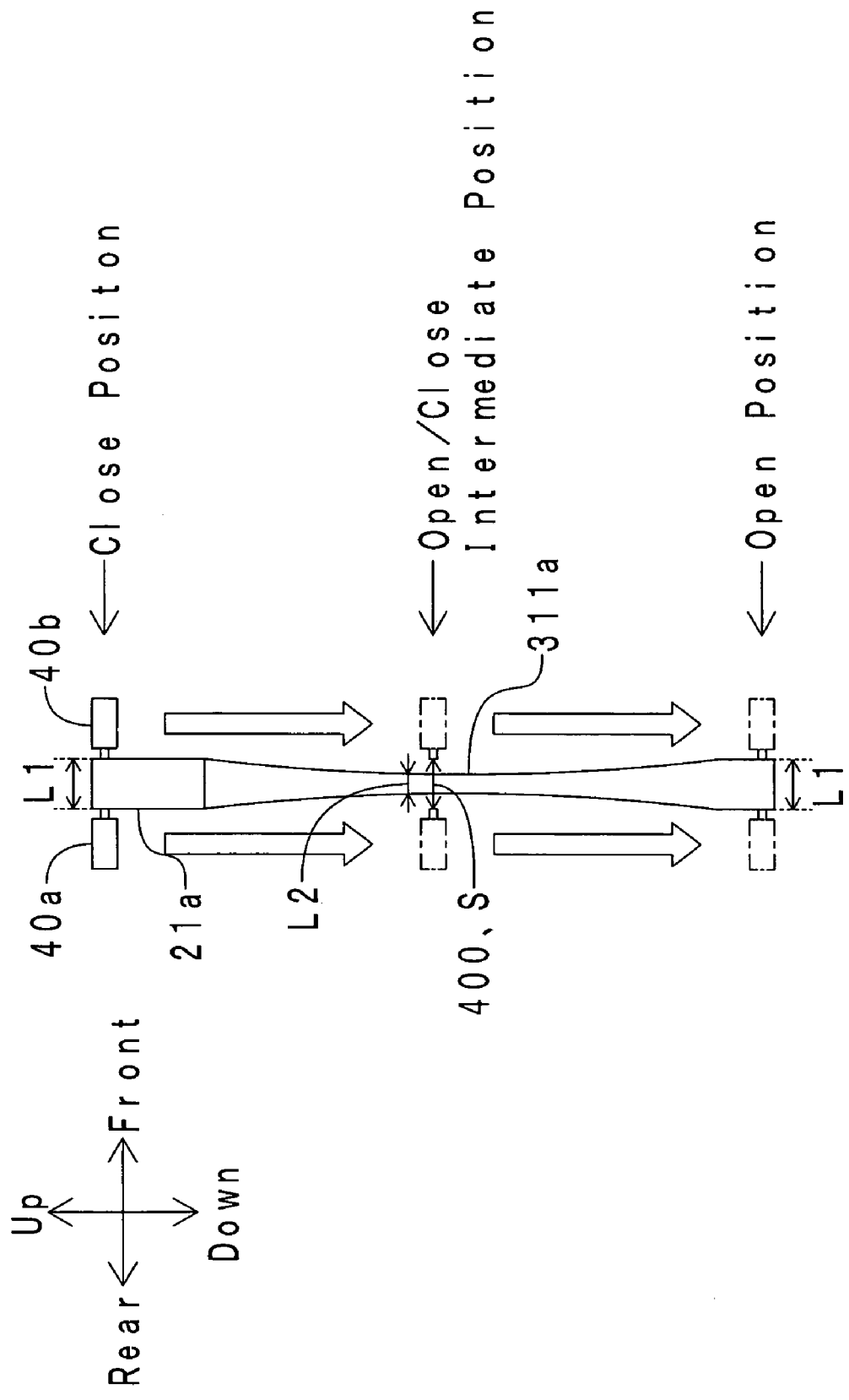
FIG. 4 is a conceptual diagram for illustrating a positional relationship between a frame-side guide rib, a box-side guide rib and a guided dent in the opening/closing mechanism of the storage apparatus according to Example No. 1.

Next, the operations of the guided dent 400, the present guided dent, with respect to the frame-side guide rib 21a and box-side guide rib 311a, the present guide ribs, will be hereinafter described. Note that the operations are demonstrated when switching the storage apparatus 1 from the open position to the close position. FIG. 4 illustrates a positional relationship between the frame-side guide rib 21a, the box-side guide rib 311a and the guided dent 400 conceptually. The rib width L1 at the top end of the frame-side guide rib 21a is equal to the dent width S of the guided dent 400 substantially. Accordingly, the frame-side guide rib 21a comes between the comb-shaped tooth 40a and the comb-shaped tooth 40b without producing any space at the close position. Consequently, no rattling occurs between the cover 4 and the assembly frame 20 at the close position.

The box-side guide rib 311a is constricted at the middle in the up/down direction. Accordingly, the rib width L2 at the middle of the box-side guide rib 311a is smaller than the dent width S of the guided dent 400. Consequently, the comb-shaped tooth 40a and comb-shaped tooth 40b do not interfere with the box-side guide rib 311a at the open/close intermediate position. That is, the cover 4 does not interfere with the box 3.

The rib width L1 at the bottom end of the box-side guide rib 311a is equal to the dent width S of the guided dent 400 substantially. Accordingly, the box-side guide rib 311a comes between the comb-shaped tooth 40a and the comb-shaped tooth 40b without producing any space at the open position, in the same manner at the close position. Consequently, no rattling occurs between the cover 4 and the assembly frame 20.

Then, the advantages effected by the storage apparatus 1 according to Example No. 1 will be hereinafter described. In the storage apparatus 1, the rib width L1 at the open position and close position, the rib width L2 at the open/close intermediate position and the dent width S establish a relationship, L2<S=L1. As a result, it is possible to inhibit the cover 4 from rattling at the open position and close position. On the other hand, it is possible to reduce the open/close resistance exerted to the cover 4 at the open/close intermediate position.

Further, the frame-side guide rib 21a, the box-side guide rib 311a and the guided dent 400 are located in a plane that passes substantially through the middle of the cover in the major direction (or front/rear direction) of the cover 4. Thus, a rattling-inhibition datum position is set substantially in the middle of the cover in the major direction of the cover 4. Therefore, it is possible to inhibit the space between the assembly frame 20 and the cover 4 from localizing.

Furthermore, the frame-side guide rib 21a and the box-side guide rib 311a are disposed over the entire track of the guided dent 400 when opening and closing the cover 4. As a result, it is possible to inhibit the cover 4 from rattling even at the open/close intermediate position while securing predetermined play resulting from the relationship, L2<S, at the open/close intermediate position.

Furthermore, the guided dent 400 and frame-side guide rib 21a can absorb the assembly error of the cover 4 which arises when assembling the cover 4 with the center console 2. That is, the cover 4 can be positioned with respect to the frame assembly 20. Therefore, the space between the cover 4 and the assembly frame 20 can be reduced at the close position. Moreover, the space between the cover 4 and the assembly frame 20c an be inhibited from localizing. In addition, the comb-shaped tooth 40a and comb-shaped tooth 40b are utilized for disposing the guided dent 400. Hence, the storage apparatus 1 according to Example No. 1 can be made up of a reduced number of component parts.

Example No. 2

Figure 5:
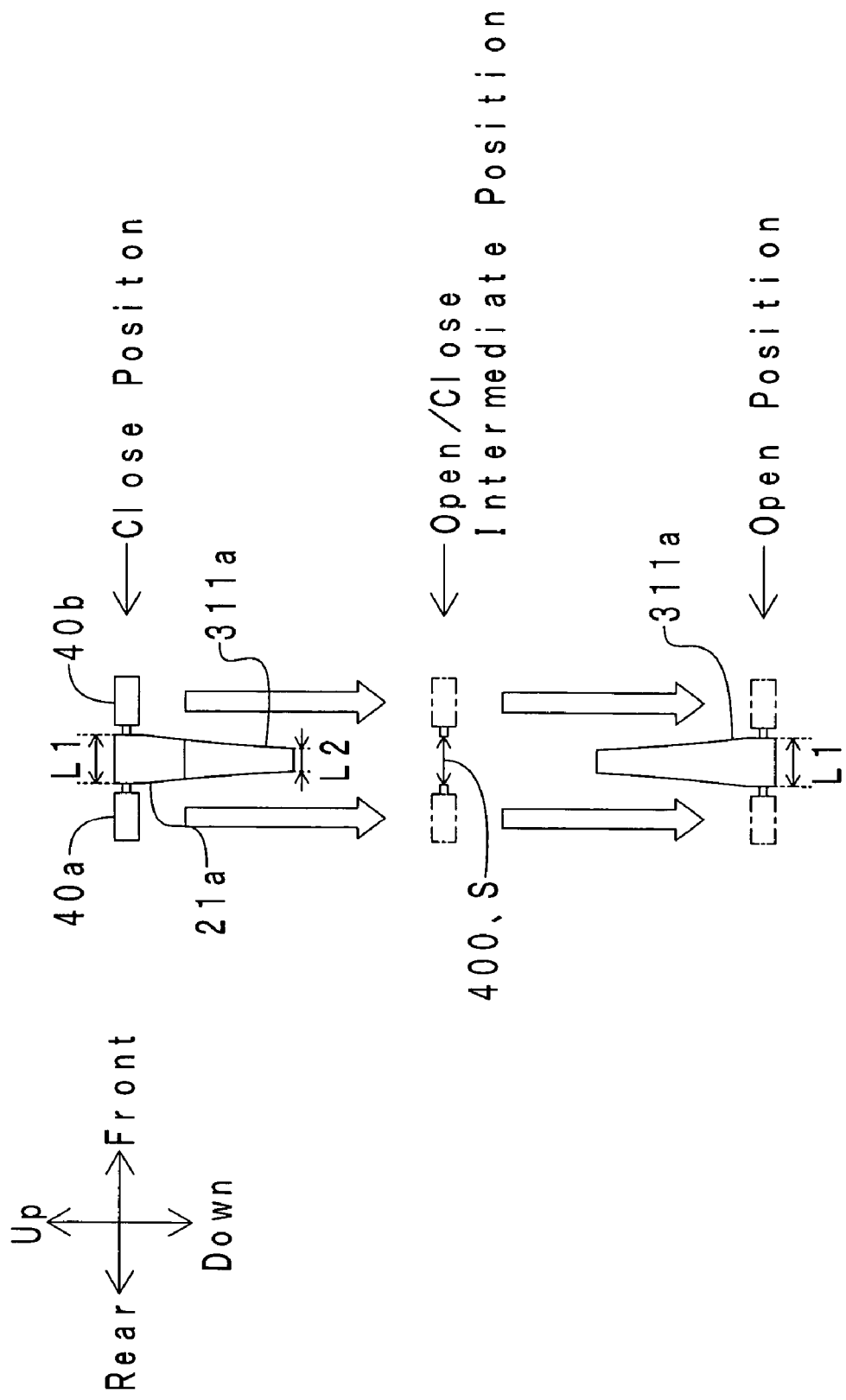
FIG. 5 is a conceptual diagram for illustrating a positional relationship between a frame-side guide rib, a box-side guide rib and a guided dent in an opening/closing mechanism of a storage apparatus according to Example No. 2 of the present invention.
Figure 6:
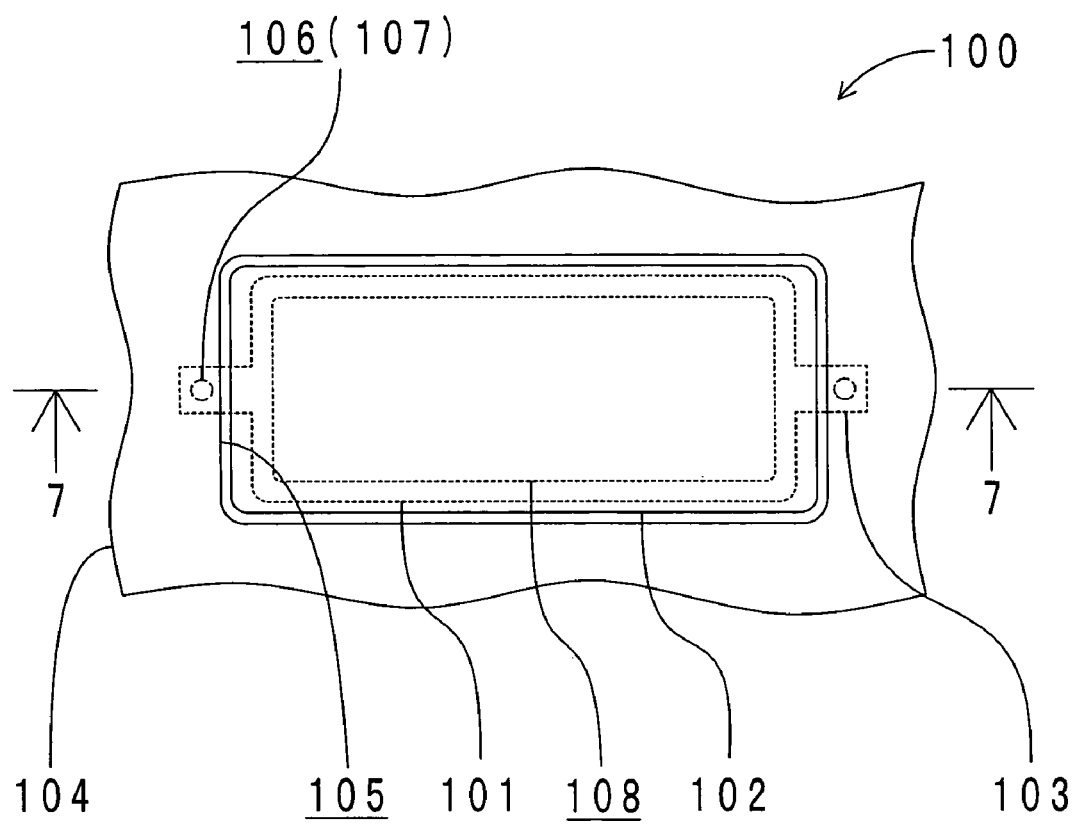
FIG. 6 is a top schematic view for illustrating the conventional cup holder.
Figure 7:
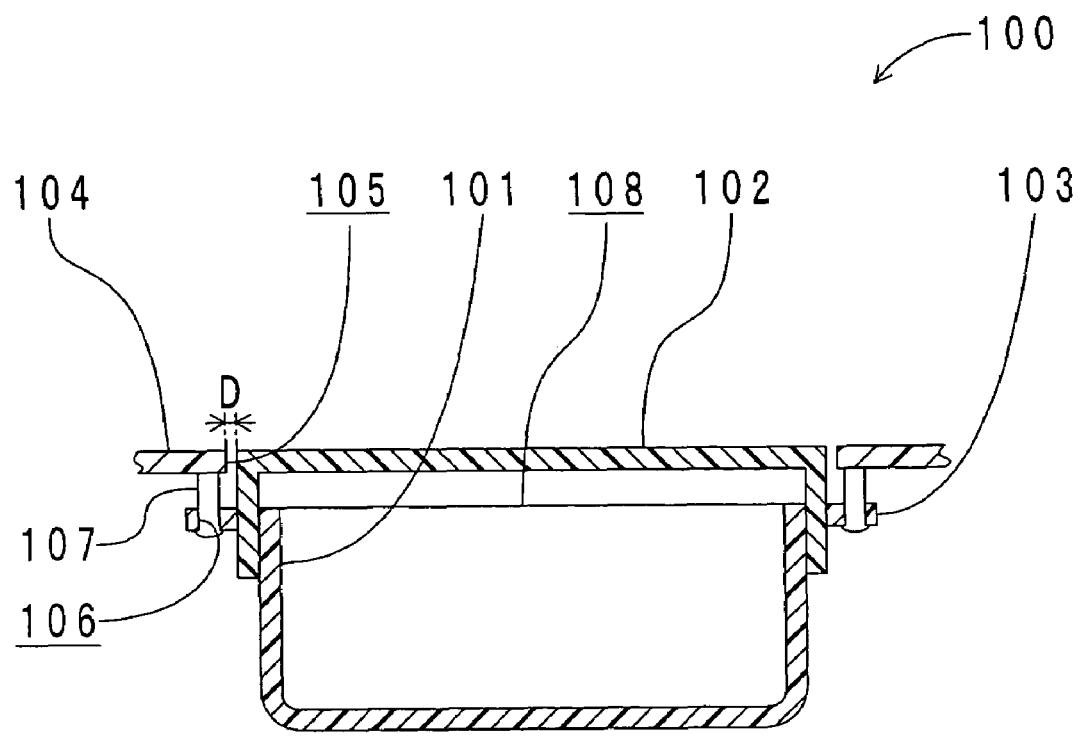
FIG. 7 is a cross-sectional view of the conventional cup holder taken along the arrows "7"-"7" of FIG. 6.

A storage apparatus according to Example No. 2 of the present invention differs from the storage apparatus 1 according to Example No. 1 in that the box-side guide ribs are not made continuous in the up/down direction. Therefore, only the difference will be hereinafter described. FIG. 5 illustrates a positional relationship between a frame-side guide rib, a box-side guide rib and a guided dent in the storage apparatus according to Example No. 2 conceptually. In FIG. 5, note that parts like those of FIG. 4 are designated at the same reference numerals. As shown in the drawing, a box-side guide rib 311a is divided in the up/down direction. Even when the storage apparatus according to Example No. 2 comprises the box-side guide rib 311a which is made discontinuous, it can inhibit the cover from rattling at the open position and the close position.

Modified Versions

Heretofore, a few of the embodiment modes of the present storage apparatus are described. However, the embodiment modes are not limited to the above-described embodiment modes particularly. It is possible to perform the present storage apparatus in various modified embodiment modes or improved embodiment modes which one of ordinary skill in the art can carry out.

For example, in the above-described examples, the ribs (i.e., the frame-side guide rib 21a and the box-side guide rib 311a) are disposed on a stationary members (i.e., the center console 2 and the box 3), and the dent (i.e., the guided dent 400) is disposed on a movable member (i.e., the cover 4), respectively. However, the ribs and dent can be disposed in a reversed manner.

Further, the frame-side guide rib 21a, the box-side guide rib 311a and the guided dent 400 can be disposed whatever positions in the major direction of the cover 4. Furthermore, the frame-side guide rib 21a, the box-side guide rib 311a and the guided dent 400 can be disposed in any quantity. Moreover, the up/down, front/rear and right/left directions referred to in the above-described examples do not necessarily limit the disposition directions of the component parts. In other words, the component parts can be disposed in any direction as far as they satisfy the above-described positional relationships relatively.

In addition, the present storage apparatus can be applied not only to those in which the cover swings but also those in which the cover slides, for example. In this instance, such a sliding-type storage apparatus can comprise a guided protrusion disposed on a side periphery of the cover; a guide groove disposed on the rear side of the base, in guide groove which the guided protrusion slides; and the guided protrusion and guide groove regulating the track of the cover. Moreover, in such a sliding-type storage apparatus, the interval between the guide groove and the guided protrusion can be controlled by narrowing the groove widths at the parts which correspond to the opposite open and close positions in the major direction of the guide groove. Thus, the guide groove can be utilized as the present guide portion, and the guided protrusion can be utilized as the present guided portion. Consequently, such a sliding-type storage apparatus can be made up of a reduced number of component parts.

Having now fully described the present invention, it will be apparent to one of ordinary skill in the art that many changes and modifications can be made thereto without departing from the spirit or scope of the present invention as set forth herein including the appended claims.

What is claimed is:

1. A storage apparatus, comprising:
   a base in which an assembly frame is demarcated;
   a box buried in the assembly frame, and having a surface in which a storage opening is opened;
   a cover covering the storage opening, which opens and closes the storage opening; and
   a guide structure, for opening and closing the cover, having a guide portion disposed on at least the assembly frame among the assembly frame and the box, and a guided portion disposed on the cover and being guided by the guide portion, wherein:
   the cover is assembled with the box, and the box is assembled with the base;
   the cover opens and closes the storage opening by pivoting around a pivot axis of the box with respect to the box;
   the guide portion and the guided portion are disposed at a middle in an axial direction of the pivot axis;
   an interval between the guide portion and the guided portion is minimized at least at a closed position, at which the cover closes the storage opening, among the closed position and an open position, at which the cover opens the storage opening;
   the guided portion engages the guide portion at least in the closed position of the cover; and
   the interval between the guide portion and the guided portion is an interval that is formed in the axial direction of the pivot axis between the guide portion and the guided portion.

2. The storage apparatus set forth in claim 1, wherein:
   the cover is formed as a long rectangular shape in the axial direction of the pivot axis; and
   the guide portion and the guided portion are disposed at a middle in the major direction of the cover.

3. The storage apparatus set forth in claim 1, wherein the interval between the guide portion and the guided portion is minimized at the closed position and the open position.

4. The storage apparatus set forth in claim 1, wherein:
   the guide portion is a guide rib extending in an opening/closing direction of the cover; and
   the guided portion is a guided dent in which the guide rib is accommodated.

5. The storage apparatus set forth in claim 4, wherein the difference between a rib width of the guide rib and a dent width of the guided dent is minimized at least at the closed position among the closed position and the open position.

6. The storage apparatus set forth in claim 4 further comprising a space in which the cover is accommodated at the open position, wherein:
   the cover comprises a plurality of comb-shaped teeth for inhibiting small articles from coming into the space; and
   the guided dent is demarcated between a pair of neighboring comb-shaped teeth of the comb-shaped teeth.

7. The storage apparatus set forth in claim 1, wherein:
   plural guide portions and plural guided portions corresponding to the plural guide portions are arrayed in the axial direction of the pivot axis; and
   the interval between the guide portion and the guided portion, which are disposed at a middle in the axial direction among the plural guide portions and the plural guided portions, is minimized at least at the closed position among the closed position and the open position.

8. The storage apparatus set forth in claim 1, wherein the guide portion is disposed over an entire track of the guided portion when the cover opens and closes the storage opening.

9. The storage apparatus set forth in claim 1, wherein when the guided portion engages the guide portion, the guided portion engages opposite sides of the guide portion.

10. The storage apparatus set forth in claim 1, wherein the box includes a body having the storage opening in an upper surface, a cover accommodating portion on the side of the body, and an arcuate guide wall on which the guide portion is formed.

11. The storage apparatus set forth in claim 1, wherein the guided portion engages the guide portion at least at a closed position and a fully open position of the cover.

12. The storage apparatus set forth in claim 1, wherein the guided portion engages the guide portion at least at a closed position and a fully open position of the cover, and the guided portion is disengaged from the guide portion at an intermediate position of the cover.

13. The storage apparatus set forth in claim 1, wherein the guided portion includes a pair of opposed teeth, and the guide portion is located between the opposed teeth.

14. The storage apparatus set forth in claim 13, wherein a width dimension of the guide portion, which is measured in the direction of the pivot axis, varies such that the guide portion disengages from the opposed teeth when the cover is moved to an intermediate position between a fully open position and the closed position.

15. The storage apparatus set forth in claim 1, wherein the guided portion engages a pair of opposite surfaces of the guide portion, and a distance between the opposite surfaces of the guide portion varies in the direction of the pivot axis such that the guided portion engages the guide portion at least at fully open and fully closed positions of the cover, and the guided portion is disengaged from the guide portion at an intermediate position of the cover.

16. The storage apparatus set forth in claim 1, wherein the guide portion is an arcuate rib and the guided portion includes a pair of teeth, which are spaced apart from one another in a direction of the pivot axis, and the teeth are adapted to engage opposite sides of the rib when the guided portion engages the guide portion.

17. The storage apparatus set forth in claim 1, wherein the box includes an arcuate wall, and the arcuate wall includes an arcuate member that forms the guide portion.

18. The storage apparatus set forth in claim 1, wherein, when the cover is accommodated at the closed position, the guided portion is engaged with the guide portion, which is formed at the assembly frame among the guide portions formed at the assembly frame and the box.

* * * * *